United States Patent
Acharya et al.

(10) Patent No.: US 7,295,562 B1
(45) Date of Patent: Nov. 13, 2007

(54) SYSTEMS AND METHODS FOR EXPEDITING THE IDENTIFICATION OF PRIORITY INFORMATION FOR RECEIVED PACKETS

(75) Inventors: Yatin R. Acharya, Sunnyvale, CA (US); Bahadir Erimli, Campbell, CA (US); Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1324 days.

(21) Appl. No.: 09/816,333

(22) Filed: Mar. 26, 2001

(51) Int. Cl.
*H04L 12/28* (2006.01)
*H04L 12/56* (2006.01)

(52) U.S. Cl. .................. 370/412; 370/428
(58) Field of Classification Search ........... 370/412, 370/413, 428, 429, 446
See application file for complete search history.

(56) References Cited

U.S. PATENT DOCUMENTS 6,108,307 A * 8/2000 McConnell et al. ........ 370/235
6,466,580 B1 * 10/2002 Leung ...................... 370/412
6,728,213 B1 * 4/2004 Tzeng et al. ............... 370/235
6,738,384 B1 * 5/2004 Chung ....................... 370/412
6,751,194 B1 * 6/2004 Ueno ......................... 370/235
6,798,743 B1 * 9/2004 Ma et al. .................... 370/235
2002/0118691 A1 * 8/2002 Lefebvre et al. .......... 370/419

OTHER PUBLICATIONS

K. Nichols et al., Network Working Group Memo: "Definition of the Differentiated Services Field (DS Field) in the IPv4 and IPv6 Headers", Dec. 1998, pp. 1-16.
S. Blake et al., Network Working Group Memo: "An Architecture for Differentiated Services", Dec. 1998, pp. 1-29.

* cited by examiner

*Primary Examiner*—Edan Orgad
*Assistant Examiner*—Blanche Wong
(74) *Attorney, Agent, or Firm*—Harrity Snyder, LLP

(57) ABSTRACT

A network device identifies priority level information for data frames it receives. The network device includes input ports, a memory, an action generator, and a port vector queue. The input ports receive the data frames. Each of the received data frames specifies one or more classes of service. The memory stores priority level information corresponding to each of the classes of service. The action generator generates an action tag for each of the received data frames. The port vector queue uses the action tag from the action generator for each of the received data frames to access the memory to identify the priority level information associated with the received data frame.

17 Claims, 7 Drawing Sheets

FIG. 6

| Register 610 | bits |
|---|---|
| CS7 (31-27) CS6 (27-23) CS5 (23-19) CS4 (19-15) CS3 (15-11) CS2 (11-7) CS1 (7-3) CS0 (3-0) | |

| Register 620 | bits |
|---|---|
| AF32 (31-27) AF31 (27-23) AF23 (23-19) AF22 (19-15) AF21 (15-11) AF13 (11-7) AF12 (7-3) AF11 (3-0) | |

| Register 630 | bits |
|---|---|
| TOS2 (31-27) TOS1 (27-23) TOS0 (23-19) EF (19-15) AF43 (15-11) AF42 (11-7) AF41 (7-3) AF33 (3-0) | |

| Register 640 | bits |
|---|---|
| (31-27) (27-23) (23-19) TOS7 (19-15) TOS6 (15-11) TOS5 (11-7) TOS4 (7-3) TOS3 (3-0) | |

250

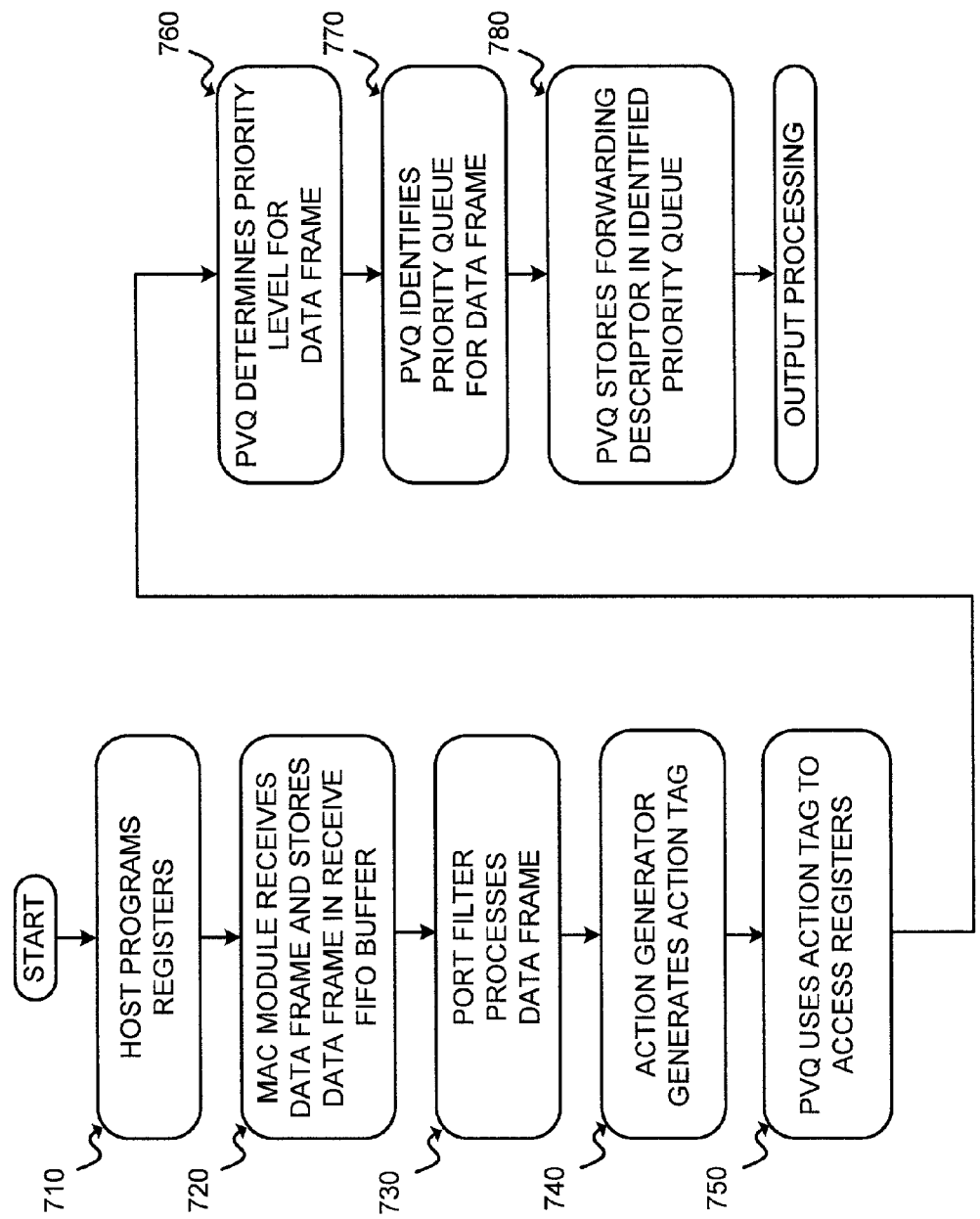

SYSTEMS AND METHODS FOR EXPEDITING THE IDENTIFICATION OF PRIORITY INFORMATION FOR RECEIVED PACKETS

TECHNICAL FIELD

The present invention relates generally to communication systems and methods and, more particularly, to systems and methods for facilitating the identification of priority information and corresponding priority queues for packets received by a network device.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

Some conventional network switches provide different classes of service for packets they route. The particular class of service to be provided to a packet may be identified within the header of the packet. The switch typically uses the identified service class in determining how to route the packet.

Conventional network switches sometimes include priority queues that buffer information for packets that await transmission from the switches. The switches usually include priority queues of a few priority levels, such as high and low priority levels. The switches must, therefore, map the identified service class of a packet to the few priority levels supported by the switches. The network switches typically use time-consuming processes to identify the priority queues within the switches to receive packets of particular classes of service. For example, the network switches may carry out the lookup of the priority information from the packet in software, which is time consuming typically performed for priority information not available at the layer 2 header on the packet.

DISCLOSURE OF THE INVENTION

There exists a need for systems and methods that facilitate the identification of priority levels and priority queues for received packets. Systems and methods consistent with the present invention address this and other needs by using programmed priority level information to expedite the identification of priority queues for packets received by a network switch. This improves the efficiency and throughput of the network switch.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that identifies priority level information for packets it receives. The network device includes input ports, a memory, an action generator, and a port vector queue. The input ports receive the packets. Each of the received packets specifies one or more classes of service. The memory stores priority level information corresponding to each of the classes of service. The action generator generates an action tag for each of the received packets. The port vector queue uses the action tag from the action generator for each of the received packets to index into the memory and, thus, identify the priority level information stored in the memory, associated with the received packet.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

FIG. 6 is an exemplary diagram of the registers of FIG. 3; and

FIG. 7 is a flowchart of exemplary processing for identifying priority levels and priority queues for received packets according to an implementation consistent with the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
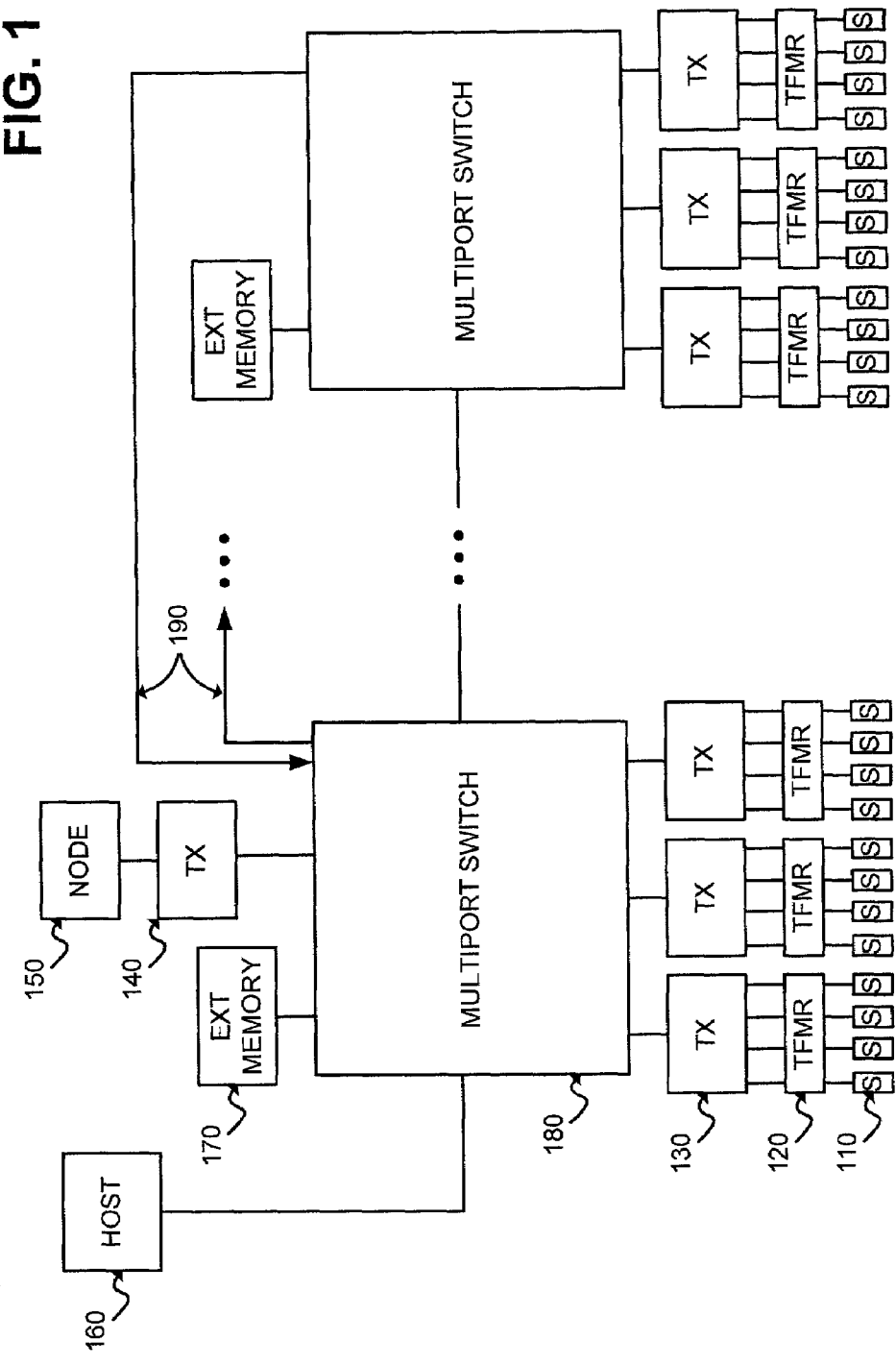
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
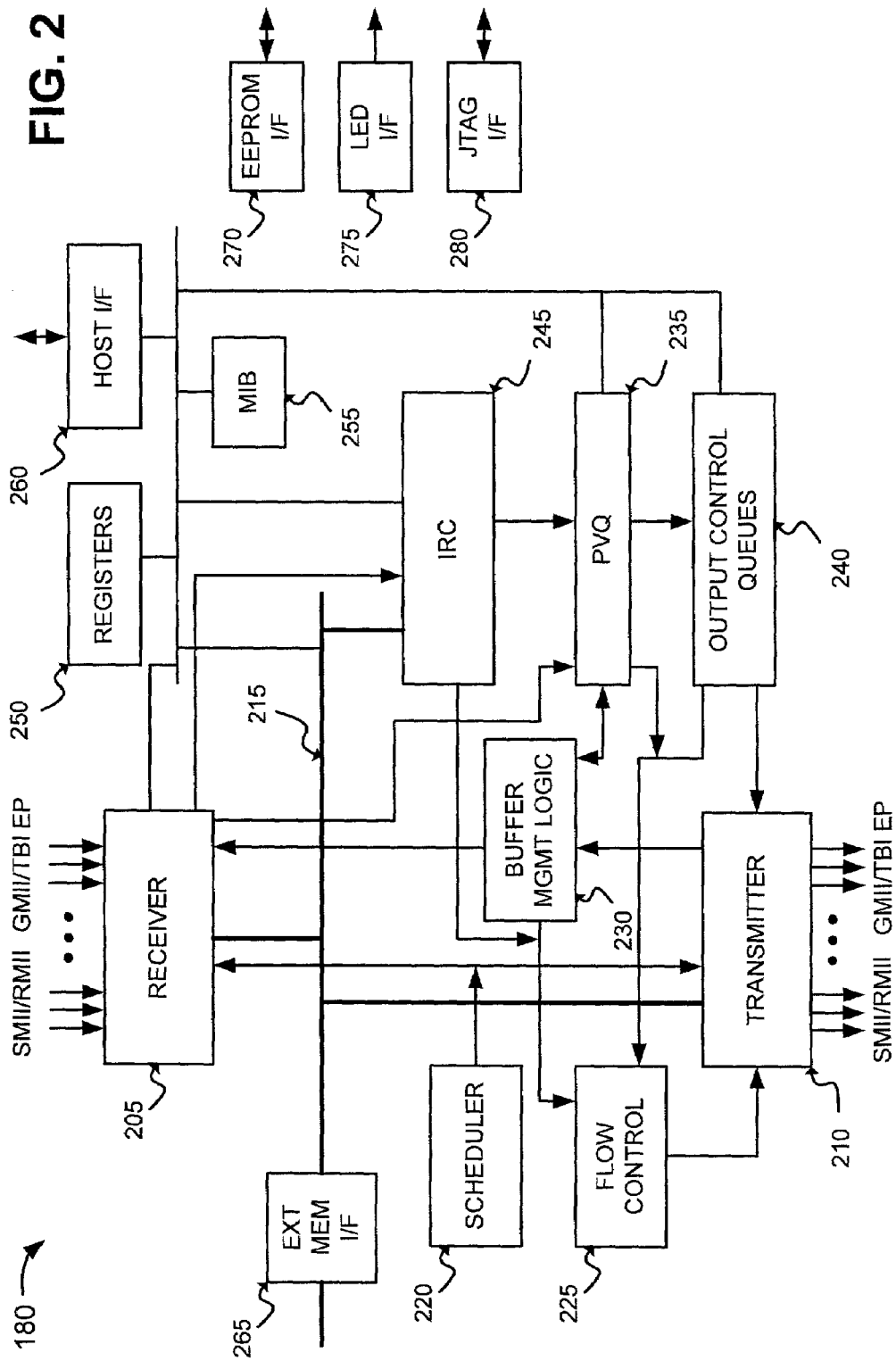
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface (I/F) 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue.

The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Priority Identification Logic

As described herein is a mechanism for expeditiously identifying priority levels and corresponding priority queues within the output control queues 240 to store the forwarding descriptor for a data frame received by a network device, such as the multiport switch 180. The mechanism also facilitates the assignment of priority levels to the packets by using programmed priority level information.

Figure 3:
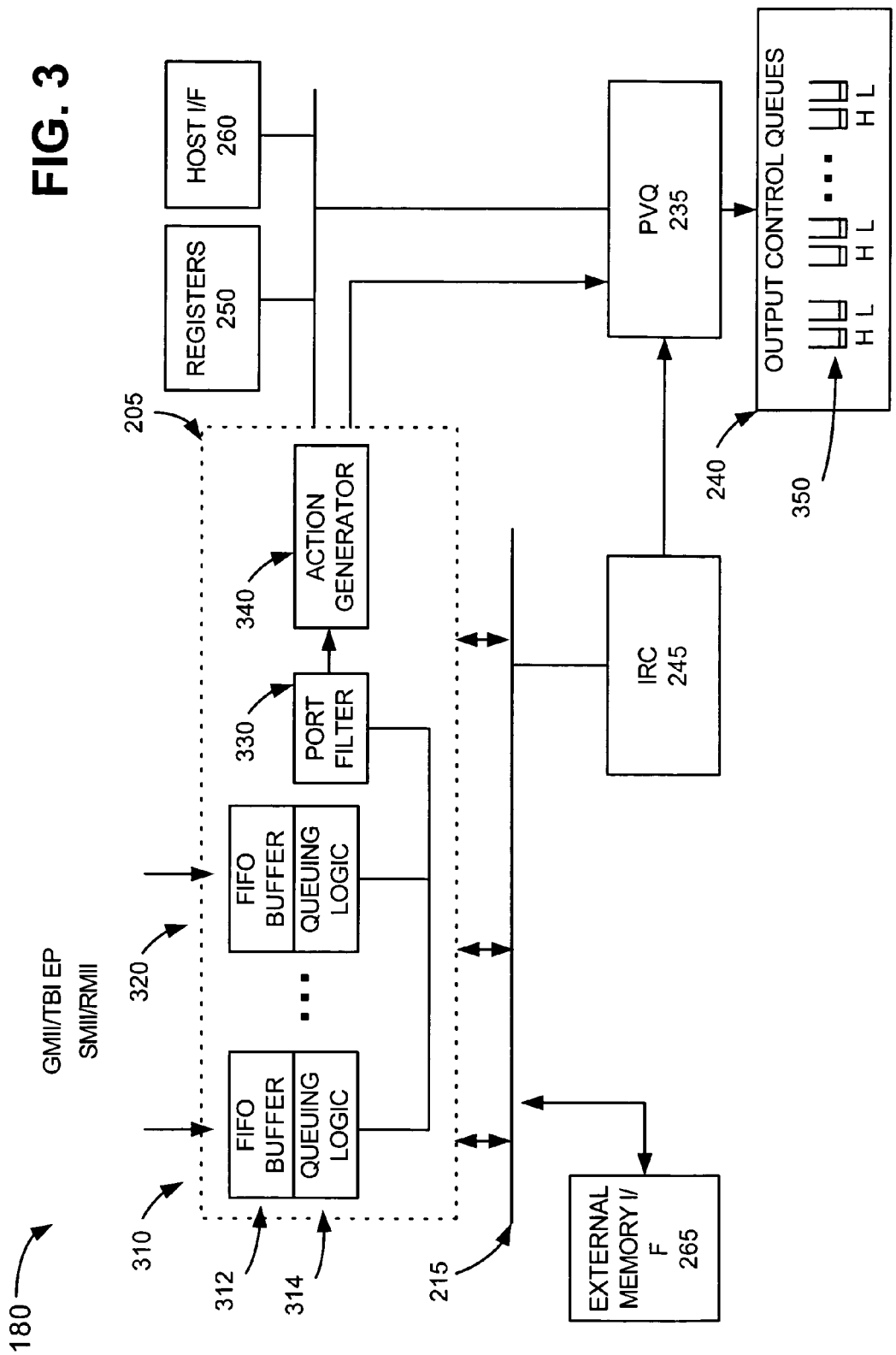
FIG. 3 is a diagram of a portion of the multiport switch of FIG. 2 according to an implementation consistent with the present invention.

FIG. 3 is a detailed diagram of a portion of the multiport switch 180 according to an implementation consistent with the present invention. The portion of the multiport switch 180 shown in FIG. 3 includes the receiver 205, the data bus 215, the PVQ 235, the output control queues 240, the IRC 245, the registers 250, the host interface 260, and the external memory interface 265. The receiver 205 may include MAC modules 310 and 320 corresponding to input ports 1 through N, respectively, a port filter 330, and an action generator 340. Each MAC module may include a receive FIFO buffer and queuing logic. For example, referring to FIG. 3, MAC module 310 may include a receive FIFO buffer 312 and queuing logic 314. The other MAC modules 320 may similarly include receive FIFO buffers and queuing logic.

The receive FIFO buffer 312 may include a FIFO that temporarily buffers data frames received on the corresponding input port. The queuing logic 314 may include logic responsible for transferring data frames from the receive FIFO buffer 312 to the external memory 170 (FIG. 1) via the external memory interface 265. The port filter 330 may include logic for determining policy information associated with the received data frames. For example, the port filter 330 may apply policy rules to the received data frames to identify one or more policy equations relating to the data frames. A policy equation may specify the type of processing to be given to a received data frame, such as whether the data frame should receive expedited, assured, or default processing or whether the data frame should be dropped or sent to a management device.

Figure 4:
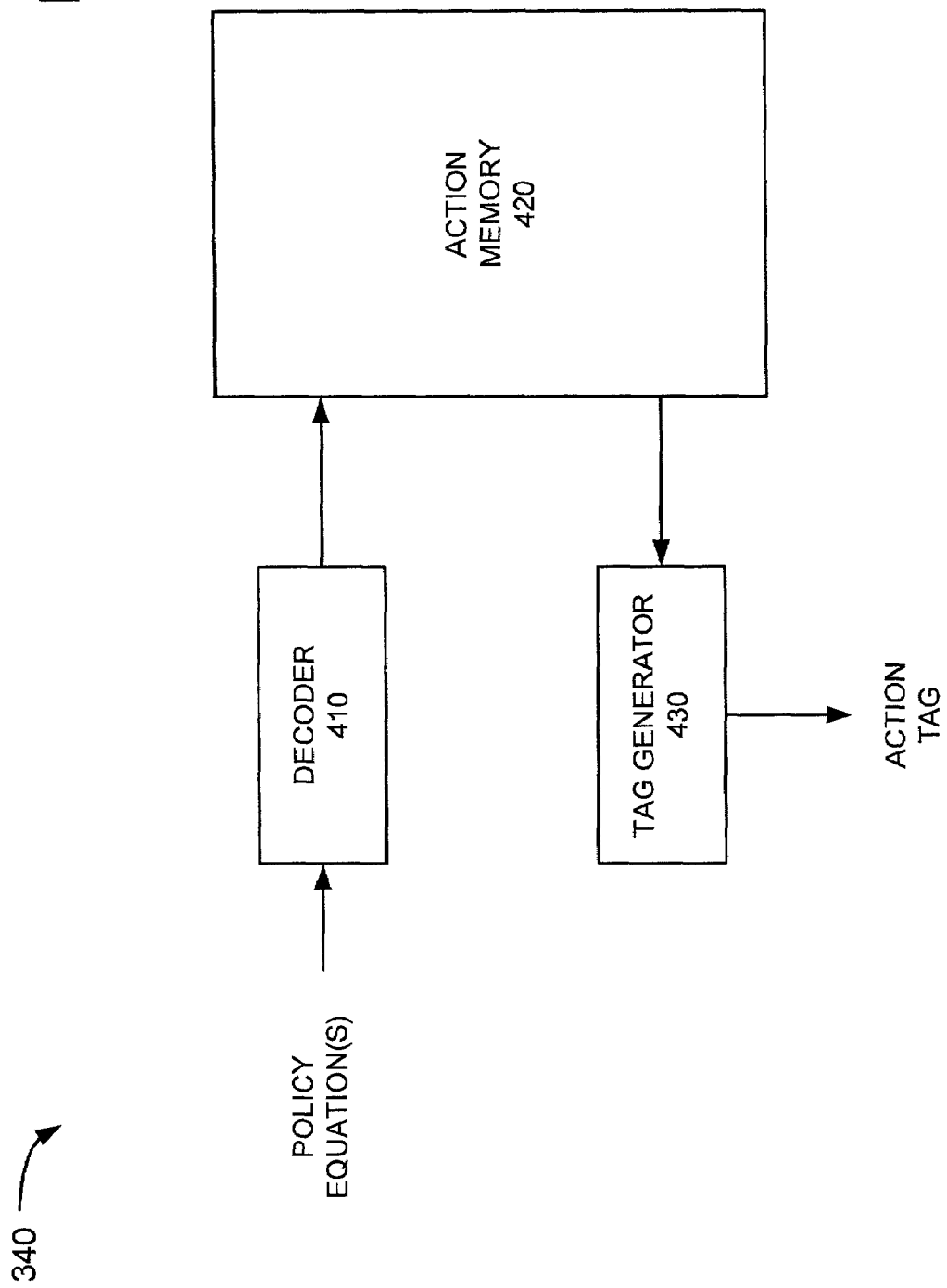
FIG. 4 is an exemplary diagram of the action generator of FIG. 3.

The action generator 340 may operate upon the result of the port filter 330 to generate an action tag for each of the received data frames. FIG. 4 is an exemplary diagram of the action generator 340 according to an implementation consistent with the present invention. The action generator 340 may include a decoder 410, an action memory 420, and a tag generator 430. The decoder 410 may receive identification of one or more policy equations associated with a received data frame from the port filter 330. If the port filter 330 identified more than one policy equation, the decoder 410 may select one of the identified policy equations. Based on the selected policy equation, the decoder 410 may generate an address into the action memory 420.

Figure 5:
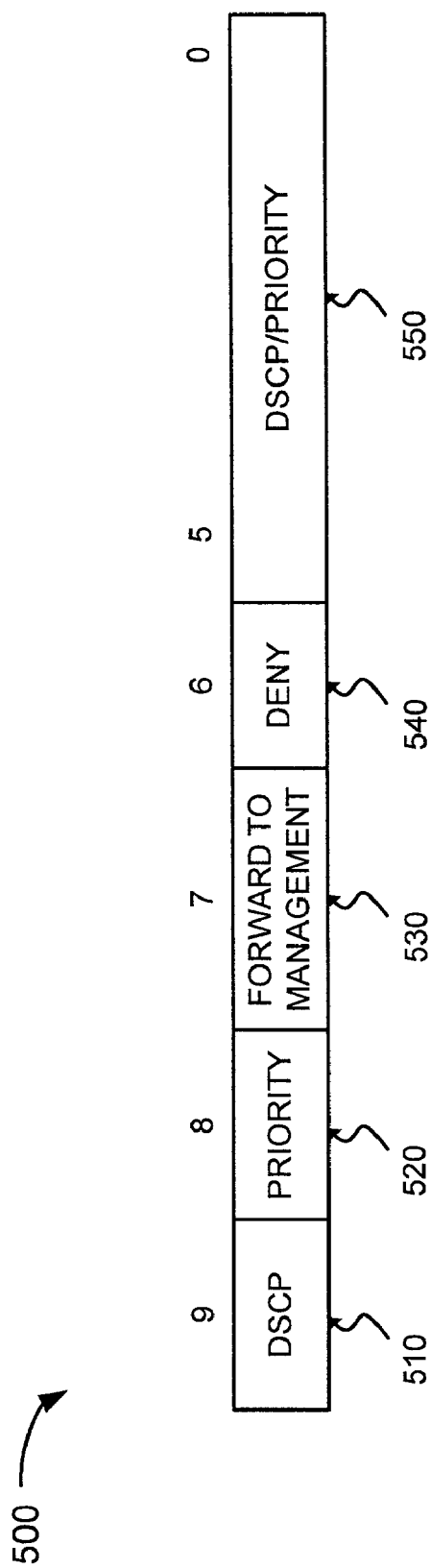
FIG. 5 is an exemplary diagram of an entry within the action memory of FIG. 3.

The action memory 420 may store information regarding the manner in which received data frames may be processed by the multiport switch 180. FIG. 5 is a diagram of an exemplary entry 500 within the action memory 420 in an implementation consistent with the present invention. The entry 500 may include a differentiated services code point (DSCP) field 510, a priority field 520, a forward-to-management field 530, a deny field 540, and a DSCP/priority field 550. The DSCP field 510 may include data that identifies whether the DSCP/priority field 550 contains valid DSCP data. The priority field 520 may include data that identifies whether the DSCP/priority field contains valid priority data. The forward-to-management field 530 may include data that identifies whether the data frame should be transmitted to a management device, such as host 160. The deny field 540 may include data that identifies whether the data frame should be dropped.

The DSCP/priority field 550 may include data that identifies a service that is to be provided or a priority that is to be given to the data frame. The service provided to a packet may include a differentiated service, such as those described in K. Nichols, "Definition of the Differentiated Services Field (DS Field) in the IPv4 and IPv6 Headers," RFC2474, ftp://ftp.normos.org/ietf/rfc/rfc2474.txt, December 1998, and in S. Blake, "An Architecture for Differentiated Services," ftp://ftp.normos.org/ietf/rfc/rfc2475.txt, December 1998.

Table 1 defines exemplary meanings of various configurations of fields 510-540 for an entry 500. In the table, "DS" refers to DSCP field 510, "P" refers to priority field 520, "FTM" refers to forward-to-management field 530, and "D" refers to deny field 540.

TABLE 1

| DS | P | FTM | D | MEANING |
|---|---|---|---|---|
| 0 | 0 | 0 | 0 | Use best efforts to route data frame |
| 1 | 0 | 0 | 0 | Process data frame based on DSCP data |
| 0 | 1 | 0 | 0 | Process data frame based on priority data |
| 0 | 0 | 1 | 0 | Route data frame to host 160 |
| 0 | 0 | 0 | 1 | Drop data frame |

Table 2 defines exemplary meanings of various configurations of the field 550 when identifying a DSCP. Within the table, "class" refers to varying degrees of default data frame forwarding, "assured forwarding" refers to prioritized best effort data frame forwarding, and "expedited forwarding" refers to data frame forwarding with the lowest level of latency, packet loss, and delay variation.

TABLE 2

| DSCP DATA | MEANING |
|---|---|
| 000000 | CS0: default forwarding class 0 |
| 001000 | CS1: default forwarding class 1 |
| 010000 | CS2: default forwarding class 2 |
| 011000 | CS3: default forwarding class 3 |
| 100000 | CS4: default forwarding class 4 |
| 101000 | CS5: default forwarding class 5 |
| 110000 | CS6: default forwarding class 6 |
| 111000 | CS7: default forwarding class 7 |
| 001010 | AF11: assured forwarding class 11 |
| 001100 | AF12: assured forwarding class 12 |
| 001110 | AF13: assured forwarding class 13 |
| 010010 | AF21: assured forwarding class 21 |
| 010100 | AF22: assured forwarding class 22 |
| 010110 | AF23: assured forwarding class 23 |
| 011010 | AF31: assured forwarding class 31 |
| 011100 | AF32: assured forwarding class 32 |
| 011110 | AF33: assured forwarding class 33 |
| 100010 | AF41: assured forwarding class 41 |
| 100100 | AF42: assured forwarding class 42 |
| 100110 | AF43: assured forwarding class 43 |
| 101110 | EF PHB: expedited forwarding class |

Table 3 defines exemplary meanings of various configurations of the field 550 when identifying a priority.

TABLE 3

| PRIORITY DATA | MEANING |
|---|---|
| 000000 | Priority 0 (TOS0) |
| 000001 | Priority 1 (TOS1) |
| 000010 | Priority 2 (TOS2) |
| 000011 | Priority 3 (TOS3) |
| 000100 | Priority 4 (TOS4) |
| 000101 | Priority 5 (TOS5) |
| 000110 | Priority 6 (TOS6) |
| 000111 | Priority 7 (TOS7) |

Returning to FIG. 4, the tag generator 430 may obtain an entry from the action memory 420 and, based on the obtained entry, assemble an action tag for transmission to the PVQ 235. The action tag informs the PVQ 235 of the manner in which the corresponding data frame is to be processed within the switch 180. The tag generator 430 may also transmit a frame pointer that identifies the data frame within the external memory 170 to the PVQ 235.

Returning to FIG. 3, the output control queues 240 may include priority queues 350 associated with different priority levels. Each of the priority queues 350 may store a forwarding descriptor related to a data frame with the corresponding priority level. FIG. 3 shows priority queues 350 associated with high and low priority levels. In other implementations consistent with the present invention, the number of priority levels and associated priority queues 350 may differ. For example, the priority levels may correspond to high, medium, and low priority levels or high, medium-high, medium-low, and low priority levels.

The registers 250 may include one or more registers programmed with priority levels that correspond to the priority queues 350. The host 160 may program the priority levels into the registers 250 via the host interface 260. The action tag generated by the action generator 340 may be used as an index into the registers 250. The PVQ 235 may use the priority levels from the registers 250 to identify the appropriate priority queue 350 within the output control queues 240 to store the frame descriptors corresponding to data frames received by the switch 180.

FIG. 6 is an exemplary diagram of the registers 250 according to an implementation consistent with the present invention. The registers 250 may include four 32 bit registers 610-640. Each of the registers 610-640 may store eight 3 bit priority levels. Register 610, for example, may store priority levels for default forwarding classes 0-7 (CS0-CS7). Register 620 may store priority levels for assured forwarding classes 11-32 (AF11-AF32). Register 630 may store priority levels for assured forwarding classes 33-43 (AF33-AF43), the expedited forwarding class (EF), and the priorities 0-2 (TOS0-TOS2). Register 640 may store priority levels for the priorities 3-7 (TOS3-TOS7).

Exemplary Processing

FIG. 7 is a flowchart of exemplary processing for identifying priority levels and corresponding priority queues for data frames received by the multiport switch 180 in accordance with an implementation consistent with the present invention. Processing may begin with the host 160 programming the registers 610-640 via the host interface 260 [act 710]. The host 160 may determine the priority level that data frames will receive based on their specified class of service. For example, the host 160 might specify that data frames belonging to the expedited forwarding class of service receive the highest priority level and data frames belonging to the default forwarding class 0 (CS0) receive the lowest priority level. The host 160 may store the priority levels in the appropriate locations within the registers 610-640.

At some point, a MAC module, such as the MAC module 310, receives a data frame [act 720]. The MAC module 310 may store the bytes of the data frame, as they are received, in the receive FIFO buffer 312 [act 720]. When at least 64 bytes, for example, of the data frame has been received, the queuing logic 314 may begin transmitting the data frame to the external memory 170 via the external memory interface 265.

Around this time, the port filter 330 may begin processing the data frame stored in the receive FIFO buffer 312 [act 730]. In particular, the port filter 330 may apply policy rules to the data frame to identify one or more policy equations relating to the data frame. As described above, the policy equations may specify the type of processing to be given to the data frame, such as whether the data frame is to receive expedited, assured, or default processing or whether the data frame is to be dropped or forwarded to a management device, such as the host 160.

The action generator 340 may act upon the policy equation (s) to generate an action tag associated with the data frame [act 740]. In particular, the decoder 410 (FIG. 4) within the action generator 340 may decode the policy equation and use it to identify an entry in the action memory 420. The tag generator 430 may use the information in the identified entry to generate a tag, which it may transmit, possibly along with a frame pointer, to the PVQ 235. The tag may resemble an entry 500 (FIG. 5) in the action memory 420.

Upon getting the tag from the action generator 340, the PVQ 235 may access the registers 610-640 to determine the appropriate priority level for the data frame [acts 750 and 760]. For example, the PVQ 235 may use the information in the DSCP/priority field 550 as an index into the registers 610-640. Assume that the DSCP/priority field 550 identifies the assured forwarding class 23 (AF23). In this case, the PVQ 235 may access bits 20-23 in the register 620 to determine the priority level assigned to the data frame.

Based on the priority level assigned to the data frame, the PVQ 235 may identify the priority queue of the priority queues 350 in the output control queues 240 to store the forwarding descriptor relating to the data frame [act 770]. The PVQ 235 may identify a priority queue 350 according to the output port from which the data frame is to be transmitted and the priority level assigned to the data frame. The PVQ 235 may identify the appropriate output port from the forwarding descriptor. As described above, the PVQ 235 may obtain the forwarding descriptor from the IRC 245. The PVQ 235 may store the forwarding descriptor in the identified priority queue 350 to await transmission by the transmitter 210 [act 780].

Described has been systems and methods for identifying priority queues and priority levels for data frames received by the multiport switch 180. By programming priority level information into a set of registers, the switch 180 may identify the priority queues for the data frames in an expedited manner, thereby maximizing the efficiency and throughput of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with regard to FIG. 7, the order of the acts may differ in other implementations consistent with the present invention.

Also, as described, priority level information is stored in a set of registers 610-640. In other implementations consistent with the present invention, the priority level information is stored in a lookup table accessible by the PVQ 235. The PVQ 235 may use data from the DSCP/priority field 550 as an index into the lookup table from which it may obtain identification of the priority level to be assigned to the data frame.

What is claimed is:

1. A system for identifying priority level information for a data frame received by a network device, comprising:
    a plurality of input ports configured to receive a plurality of data frames, each of the received data frames specifying at least one of a plurality of classes of service;
    a memory configured to store a plurality of priority levels, one for each of the plurality of classes of service, wherein the memory includes a plurality of registers or a lookup table;
    an action generator configured to generate an action tag for each of the received data frames, wherein the action generator includes:
        an action memory configured to store a plurality of entries, wherein each of the entries includes:

a differentiated services code point (DSCP)/priority field configured to store one of DSCP data and priority data relating to one of the classes of service, a deny field configured to store data indicating whether to drop a corresponding one of the received data frames, a forward-to-management field configured to store data indicating whether to forward the corresponding data frame to a management device, a priority field configured to store data indicating whether the DSCP/priority field stores valid priority data, and a DSCP field configured to store data indicating whether the DSCP/priority field stores valid DSCP data, a decoder configured to identify one of the entries in the action memory in response to the received data frames, and a tag generator configured to generate the action tags based on the identified entries; and a port vector queue configured to use the action tag from the action generator for each of the received data frames to access the memory to retrieve one of the stored priority levels that corresponds to a class of service specified by each of the received data frames.

2. The system of claim 1, wherein the DSCP data indicates:

one of a number of default data frame forwarding classes, one of a number of assured data frame forwarding classes, or an expedited data frame forwarding class.

3. The system of claim 2, wherein the assured data frame forwarding classes correspond to classes of prioritized best effort data frame forwarding.

4. A method for identifying priority level information for a data frame received by a network device, comprising:

programming a memory with a plurality of priority levels, one for each class of service of a plurality of classes of service, wherein the memory includes a plurality of registers or a lookup table;

receiving a plurality of data frames, each of the received data frames specifying at least one of the classes of service;

generating an action tag for each of the received data frames, wherein generating an action tag includes:

storing a plurality of entries, wherein each of the entries includes:

a differentiated services code point (DSCP)/priority field configured to store one of DSCP data and priority data relating to one of the classes of service, a deny field configured to store data indicating whether to drop a corresponding one of the received data frames, a forward-to-management field configured to store data indicating whether to forward the corresponding data frame to a management device, a priority field configured to store data indicating whether the DSCP/priority field stores valid priority data, and a DSCP field configured to store data indicating whether the DSCP/priority field stores valid DSCP data, identifying one of the stored entries in response to the received data frames, and generating the action tags based on the identified entries; and accessing the memory to retrieve one of the plurality of priority levels that corresponds to a class of service specified by each of the received data frames.

5. The method of claim 4, wherein the DSCP data indicates:

one of a number of default data frame forwarding classes, one of a number of assured data frame forwarding classes, or an expedited data frame forwarding class.

6. The method of claim 5, wherein the assured data frame forwarding classes correspond to classes of prioritized best effort data frame forwarding.

7. A multiport network device, comprising:

a plurality of input ports configured to receive a plurality of data frames, each of the data frames specifying at least one of a plurality of classes of service;

a plurality of output ports configured to transmit at least some of the data frames;

a plurality of priority queues associated with each of the output ports;

a memory configured to store a plurality of priority levels, one for each of the plurality of classes of service, wherein the memory is configured to be preprogrammed with the plurality of priority levels by a host device;

an action generator including:

an action memory configured to store a plurality of entries, wherein each of the entries includes:

a first field configured to store differentiated services code point (DSCP) data or priority data relating to one of the classes of service, a second field configured to store data indicating whether the first field stores valid priority data, and a third field configured to store data indicating whether the first field stores valid DSCP data, a decoder configured to identify one of the entries in the action memory for each of the data frames, and a tag generator configured to generate an action tag based on the entry identified for each of the data frames; and a port vector queue configured to access the memory to retrieve one of the stored priority levels that corresponds to a class of service specified by each of the data frames using the action tag from the action generator for the data frame and identify one of the priority queues based on the identified priority level information for the data frame.

8. The multiport network device of claim 7, wherein the DSCP data indicates:

one of a number of default data frame forwarding classes, one of a number of assured data frame forwarding classes, or an expedited data frame forwarding class.

9. The multiport network device of claim 8, wherein the assured data frame forwarding classes correspond to classes of prioritized best effort data frame forwarding.

10. The multiport network device of claim 7, wherein each of the entries further includes:

a fourth field configured to store data indicating whether to drop a corresponding one of the received data frames, and a fifth field configured to store data indicating whether to forward the corresponding data frame to a management device.

11. A multiport network device, comprising:
a plurality of input ports configured to receive a plurality of data frames, each of the data frames specifying at least one of a plurality of classes of service;
a plurality of output ports configured to transmit at least some of the data frames;
a plurality of priority queues associated with each of the output ports;
a memory configured to store priority level information corresponding to each of the plurality of classes of service;
an action generator including
   an action memory configured to store a plurality of entries, wherein each of the entries includes:
      a first field configured to store differentiated services code point (DSCP) data or priority data relating to one of the classes of service,
      a second field configured to store data indicating whether the first field stores valid priority data, and
      a third field configured to store data indicating whether the first field stores valid DSCP data,
   a decoder configured to identify one of the entries in the action memory for each of the data frames, and
   a tag generator configured to generate an action tag based on the entry identified for each of the data frames;
a port vector queue configured to access the memory to identify the priority level information associated with each of the data frames using the action tag from the action generator for the data frame and identify one of the priority queues based on the identified priority level information for the data frame; and
a port filter configured to apply policy rules to the data frames to identify one or more policy equations corresponding to the data frames,
wherein the decoder is configured to receive the one or more policy equations corresponding to one of the data frames from the port filter, select one of the one or more policy equations, and use the selected policy equation to identify one of the entries in the action memory.

12. The multiport network device of claim 11, wherein each of the entries further includes:
a fourth field configured to store data indicating whether to drop a corresponding one of the received data frames, and
a fifth field configured to store data indicating whether to forward the corresponding data frame to a management device.

13. The multiport network device of claim 11, wherein the DSCP data indicates:
one of a number of default data frame forwarding classes,
one of a number of assured data frame forwarding classes, or
an expedited data frame forwarding class.

14. The multiport network device of claim 13, wherein the assured data frame forwarding classes comprise classes of prioritized best effort data frame forwarding.

15. A system for identifying priority level information for a data frame received by a network device, comprising:
a plurality of input ports configured to receive a plurality of data frames, each of the received data frames specifying at least one of a plurality of classes of service;
a memory configured to store priority level information corresponding to each of the plurality of classes of service, wherein the memory includes one of a plurality of registers or a lookup table;
an action generator configured to generate an action tag for each of the received data frames, wherein the action generator includes:
   an action memory configured to store a plurality of entries, wherein each of the entries includes:
      a differentiated services code point (DSCP)/priority field configured to store one of DSCP data and priority data relating to one of the classes of service,
      a deny field configured to store data indicating whether to drop a corresponding one of the received data frames,
      a forward-to-management field configured to store data indicating whether to forward the corresponding data frame to a management device,
      a priority field configured to store data indicating whether the DSCP/priority field stores valid priority data, and
      a DSCP field configured to store data indicating whether the DSCP/priority field stores valid DSCP data,
   a decoder configured to identify one of the entries in the action memory in response to the received data frames, and
   a tag generator configured to generate the action tags based on the identified entries; and
a port vector queue configured to use the action tag from the action generator for each of the received data frames to access the memory to identify the priority level information associated with the received data frame.

16. The system of claim 15, wherein the DSCP data indicates:
one of a number of default data frame forwarding classes,
one of a number of assured data frame forwarding classes, or
an expedited data frame forwarding class.

17. The system of claim 16, wherein the assured data frame forwarding classes comprise classes of prioritized best effort data frame forwarding.

* * * * *